Dec. 9, 1924.                                                                                1,518,421
W. T. WAKEFORD
PROCESS FOR THE SEPARATION OF AMMONIA FROM ITS FORMATIVE GASES
Filed Feb. 27, 1922
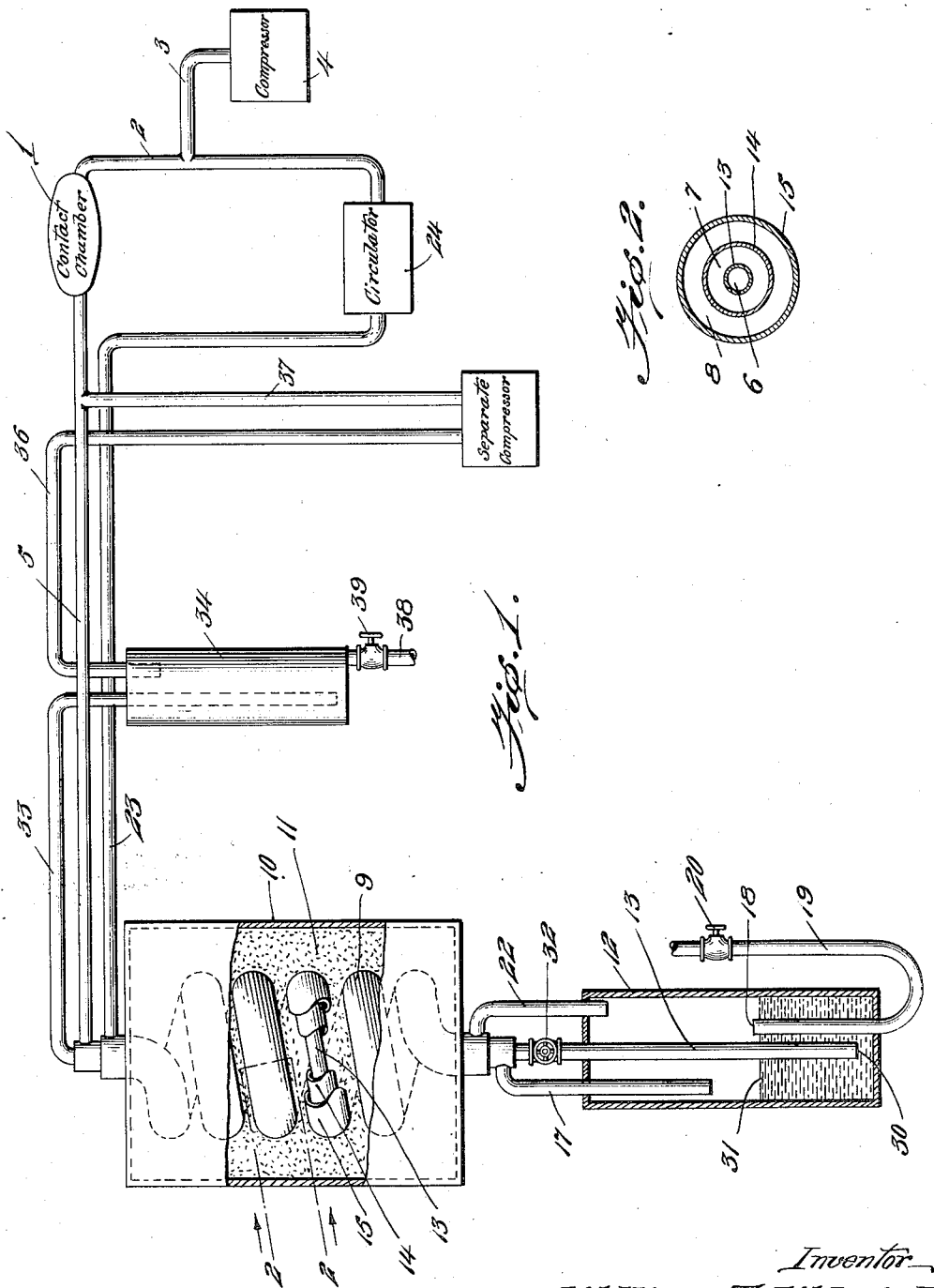

Patented Dec. 9, 1924.

1,518,421

UNITED STATES PATENT OFFICE.

WILLIAM T. WAKEFORD, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS FOR THE SEPARATION OF AMMONIA FROM ITS FORMATIVE GASES.

Application filed February 27, 1922. Serial No. 539,655.

*To all whom it may concern:*

Be it known that I, WILLIAM T. WAKEFORD, a citizen of the United States, residing at Providence, in the county of Providence and State of Rhode Island, have invented certain new and useful Improvements in Processes for the Separation of Ammonia from its Formative Gases, of which the following is a specification.

This invention relates to a process and apparatus for the production of ammonia, and more particularly an improved method of and apparatus for bringing a mixture of nitrogen and hydrogen into contact with a catalytic agent to form ammonia and separating the ammonia thus formed from the residual gases to secure a product of great purity with a minimum expenditure of time and labor.

One object of the invention is to provide an improved method of operation whereby the ammonia formed by contacting a nitrogen-hydrogen mixture with a catalytic agent may be removed from the residual gases without materially reducing the pressure in the main circulatory system, and at the same time a fresh supply of the mixture of nitrogen and hydrogen constantly added under pressure to the gases remaining after the removal of the ammonia content therefrom thus avoiding the necessity of raising the pressure of the mass of circulatory gas after each removal of the ammonia content and economizing time and labor.

Another object of the invention is to provide a convenient means for separating the ammonia content from the gases emerging from the synthesizing chamber by expanding a portion of the liquid ammonia formed as a result of the synthesis and utilizing the expanding ammonia to liquify the compressed gases while at the same time recovering the expanded ammonia and returning the same to the system for liquefaction.

A further object of the invention is the provision of an improved apparatus of the character described comprising a circulatory system whereby constant circulation of the gases may be effected under substantially uniform conditions of pressure.

Other objects and advantages of the invention relate to certain improved steps and combinations of steps as well as certain improved details of construction and arrangement of the parts as will be more fully set forth in the detailed description to follow.

In the annexed drawings Fig. 1 is a diagrammatic illustration of one form of apparatus which may be advantageously employed in carrying out the improved process certain portions thereof being shown in section to better illustrate the details of construction and method of operation, and Fig. 2 is a sectional view of a portion of the liquefying coil taken along the line 2—2 of Fig. 1.

Referring to the drawings 1 designates the contact chamber of an ammonia synthesis apparatus within which is placed the catalytic agent for forming ammonia from the nitrogen-hydrogen mixture, the gases to be synthesized entering the chamber 1 through the pipe 2 to which they are supplied through a pipe 3 leading from a compressor 4 in which they are placed under the requisite pressure after having been drawn from a suitable source of supply. After having passed into contact with the hot catalytic agent in the chamber 1, the gases pass therefrom through the pipe 5 and into the intermediate passage 7 of a coil 9 enclosed in a casing 10.

The coil 9 includes a plurality of concentric tubes, in the present instance three in number, which are positioned one within another and preferably surrounded by a heat insulating material 11 such as cork or the like. The coil may be of any desired length to best accomplish the cooling of the gases entering from the contact chamber, and the coil 9 taken in conjunction with the receptacle 12 and their connecting parts form a liquefier the main function of which is to liquefy the ammonia content of the gases coming from the contact chamber and thus separate the ammonia therefrom. The coil 9 comprises concentrically arranged pipes 13, 14 and 15 forming concentrically arranged passages 6, 7 and 8 respectively. The passage 7 into which the gases pass from the contact chamber is the intermediate of the three passages and this passage communicates with the interior of the receptacle by means of a connecting pipe 17 although connection with the receptacle may be made by prolonging the tube 14 within the receptacle instead of employing the connecting pipe 17. In any event however the pipe 17, or that portion of the tube 14 which may project within the receptacle 12 terminates substantially midway between the bottom and top of the receptacle and slightly above the open end 18 of a pipe 19 entering the base of the receptacle 12. Thus as the gases entering the coil 9 from the contact chamber are cooled in passing downwardly through the passage 7 the ammonia content of the gases is liquefied and passes into the receptacle 12 and accumulates therein until the level of the liquid ammonia reaches the open end 18 of the pipe 19 when the surplus ammonia may be removed by opening the valve 20 in the pipe 19 and placed in a suitable tank or container. The residual uncombined nitrogen and hydrogen gases entering the receptacle 12 through the pipe 17 fills the upper portion of the receptacle and may pass out through the pipe 22 into the passage 8 within the outer tube 15 of the coil whereupon it passes upwardly through the coil 9 and enters the pipe 23 from which it passes to the circulating pump 24 and is thereby forced forward through the pipe 2 into the contact chamber for further synthesis. The outer tube 15 of the coil may be extended downwardly into the receptacle 12 instead of making use of the connecting pipe 22 as shown, but in either case the tube 15 or the connecting pipe 22 preferably terminates above the open end of the tube 14 or its equivalent pipe 17 in order to better facilitate the proper circulation of the gases throughout the main circulatory system. The main circulatory system comprises the contact chamber 1, pipe 5, tube 14 and connection 17 to the receptacle, as well as the connection 22, the tube 15, pipe 23, circulating pump 24 and pipe 2 from the pump to the contact chamber thus forming in effect a closed circulatory system wherein the mixture of nitrogen and hydrogen gases pass into contact with a catalytic agent in the contact chamber and from there to the liquefier for the removal of the ammonia formed and thence through the circulating pump to the contact chamber whereby repeated synthesis of the nitrogen and hydrogen is effected a fresh supply of the nitrogen-hydrogen mixture being fed into the system from the pipe 3 as may be required to replace the gases removed in the formation of ammonia.

The inner tube 13 of the coil 9 extends into the receptacle 12 and terminates at a point 30 adjacent to the bottom of the receptacle and below the normal level 31 of the liquid ammonia in the receptacle. A valve 32 located in the tube 13 above the receptacle 12 may be opened to permit the liquid ammonia contained in the receptacle to expand into the passage 6 and thus absorb heat to cool the gases from the contact chamber in the passage 7 for the purpose of liquefying the ammonia from the gases. The expanded ammonia passes from the tube 13 at the top of the coil into a pipe 33 from which it passes to a trap 34 for the purpose of removing any ammonia which may be present therein in the liquid state. From the trap 34 the ammonia is conducted to a separate compressor 35 through a pipe 36 where the gas is placed under a pressure substantially equal to that in the main circulatory system when the gas is forced back into the main circulatory system through the pipe 37 to enter the main system between the contact chamber and liquefier and pass with the gases from the contact chamber through the passage 7 in the coil to liquefy the ammonia.

The pressure in the main circulatory system is substantially constant throughout the system being only slightly lowered by the removal of the ammonia content of the gases in the passage 7 and this slight lowering of the pressure is made up by the addition of a fresh nitrogen and hydrogen mixture from the compressor 4, while the gases are constantly circulated through the system by means of the circulatory pump 24. A pipe 38 provided with a valve 39 serves to permit the removal of any liquid ammonia which may accumulate in the trap 34. The various joints between the several pipes and other elements of the apparatus may be made by welding to prevent the possibility of gases escaping at these points, and the tubes 13, 14 and 15 are preferably joined to each other at the ends of the coil 9 by welding. The ammonia expanded in the tube 13 to cool the gases from the contact chamber sufficiently to liquefy the ammonia contained therein can be returned to the pressure of the main circulatory system by means of the separate compressor 35 with the expenditure of a relatively small amount of power and the provision of this separate compressor and the shunt circuit formed of the tube 13 pipe 33, trap 34, pipe 36 compressor 35 and pipe 37 avoids the necessity of lowering the pressure of the residual uncombined nitrogen and hydrogen as well as avoiding the placing of an unduly heavy load upon the circulatory pump 24 as would be the case if a portion of the mixed gases were expanded in obtaining the cooling effect.

From the above description it will be seen that I have provided a novel means for separating the ammonia content of the gases from the nitrogen and hydrogen remaining uncombined as they emerge from the contact chamber by expanding a portion of the liquefied ammonia out of contact with the residual gases and in heat exchanging relation with the gases from the contact chamber.

This is accomplished in a shunt circuit thus permitting the maintenance of the pressure substantially uniform in the main circulatory system, and the ammonia thus expanded is readily compressed and returned to the system for removal together with the ammonia formed in the contact chamber. The pressure throughout the main circulatory system may be maintained at the point best adapted to further the synthetic production of ammonia in the contact chamber such, for example as eighty to one hundred and fifty atmospheres, depending upon the catalytic agent employed and the conditions of operation.

What I claim is:

1. In a process for separating synthetic ammonia from its formative gases in a closed system which includes a main synthesizing circuit and a shunt circuit, the steps comprising, separating a portion of the ammonia from its formative gases by liquefaction, returning the residual gases for retraversement of the main circuit, and expanding a portion of the liquid ammonia in a shunt circuit to cool a fresh supply of gases.

2. In a process for separating synthetic ammonia from its formative gases in a closed system, the steps comprising separating the ammonia formed between each passage of the formative gases through the system by liquefaction while maintaining the gases under substantially uniform pressure, and expanding a portion of the liquid ammonia to cool a fresh supply of gases and effect the liquefaction of the ammonia content therefrom.

3. In a process for separating synthetic ammonia from its formative gases in a closed system which includes a main circuit and a shunt circuit, the steps comprising separating the ammonia formed between each passage of the gases through the system by liquefaction while maintaining the gases under substantially uniform pressure, expanding a portion of the liquid ammonia in the shunt circuit to effect liquefaction of the ammonia from a fresh supply of gases, compressing said expanded ammonia, and returning the same to the main circuit.

4. In a process for separating synthetic ammonia from its formative gases in a closed system which includes a main synthesizing circuit and a shunt circuit the steps comprising, separating a portion of the ammonia from its formative gases by liquefaction, returning the residual gases for retraversement of the main circuit, expanding a portion of the liquid ammonia in a shunt circuit to cool a fresh supply of gases, compressing said expanded ammonia in the shunt circuit and returning the same to the main circuit.

In testimony whereof I have affixed my signature.

WILLIAM T. WAKEFORD.